United States Patent [19]

Pfefferle

[11] 3,940,923

[45] Mar. 2, 1976

[54] METHOD OF OPERATING CATALYTICALLY SUPPORTED THERMAL COMBUSTION SYSTEM

[75] Inventor: William C. Pfefferle, Middletown, N.J.

[73] Assignee: Engelhard Minerals & Chemicals Corporation, Murray Hill, N.J.

[22] Filed: Apr. 24, 1974

[21] Appl. No.: 463,436

Related U.S. Application Data

[63] Continuation-in-part of Ser. Nos. 142,939, May 13, 1971, abandoned, and Ser. No. 164,718, July 2, 1971, abandoned, and Ser. No. 197,323, Nov. 10, 1971, abandoned, and Ser. No. 358,411, May 8, 1973.

[52] U.S. Cl. .................... 60/39.06; 60/39.02; 431/7

[51] Int. Cl.[2] .......................... F02C 3/16; F02C 7/26

[58] Field of Search ............ 60/39.02, 39.03, 39.04, 60/39.06, 39.17, 39.82 C, 301; 431/7, 328

[56] References Cited

UNITED STATES PATENTS

| | | | |
|---|---|---|---|
| 2,243,467 | 5/1941 | Jendrassik | 60/39.04 |
| 2,632,296 | 3/1953 | Houdry | 60/39.82 C |
| 3,191,659 | 6/1965 | Weiss | 431/328 |
| 3,705,492 | 12/1972 | Vickers | 60/39.51 R |
| 3,890,088 | 6/1975 | Ferri | 431/351 |

FOREIGN PATENTS OR APPLICATIONS

| | | | |
|---|---|---|---|
| 842,780 | 7/1960 | United Kingdom | 60/39.82 C |

OTHER PUBLICATIONS

Haslam et al., Fuels and Their Combustion, N.Y., 1926, pp. 266, 282, 287–288.

Smith I. E., (editor), Combustion in Advanced Gas Turbine Systems, Pergamon Press, 1967, pp. 14–15.

*Primary Examiner*—William L. Freeh
*Assistant Examiner*—L. J. Casaregola

[57] ABSTRACT

An improved method is provided for more efficiently operating a catalytically supported thermal combustion gas turbine system, and at the same time provide low emissions of unburned hydrocarbons, carbon monoxide, and nitrogen oxides. In the adiabatic combustion of the fuel and air admixture at least a portion of the thermal combustion of the fuel takes place in the expansion zone of the gas turbine to counteract the cooling effect of the expansion of the gases.

16 Claims, 5 Drawing Figures

METHOD OF OPERATING CATALYTICALLY SUPPORTED THERMAL COMBUSTION SYSTEM

This application is a continuation-in-part of my prior abandoned applications, Ser. No. 142,939, filed May 13, 1971 and Ser. No. 164,718, filed July 21, 1971, and my copending applications, Ser. No. 197,323, filed Nov. 10, 1971 (not abandoned) and Ser. No. 358,411, filed May 8, 1973.

BACKGROUND OF THE INVENTION

There is disclosed in my copending application, Ser. No. 358,411, filed May 8, 1973, a method and system for the catalytically supported thermal combustion of carbonaceous fuels. The invention of said application pertains particularly to the catalytically supported thermal combustion of carbonaceous fuels under essentially adiabatic conditions, without the formation of substantial emissions of carbon monoxide and nitrogen oxides ($NO_x$), particularly the latter.

Disclosed in my copending application is a method of combustion which is distinct from purely thermal combustion and purely catalytic combustion. The method comprises a unique combination of catalytically supported thermal combustion.

In conventional thermal combustion fuel and air in inflammable proportions are contacted with an ignition source, e.g., a spark, to ignite the mixture which will then continue to burn. Flammable mixtures of most fuels are normally burned at relatively high temperatures, i.e., in the order of about 3300°F. and above, which inherently results in the formation of substantial emissions of $NO_x$. In the case of gas turbine combustors, the formation of $NO_x$ can be greatly reduced by limiting the residence time of the combustion products in the combustion zone. However, even under these circumstances undesirable quantities of $NO_x$ are nevertheless produced. In addition limiting such residence time makes it difficult to maintain stable combustion even after ignition.

In purely catalytic combustion systems, there is little or no $NO_x$ formed in a system which burns the fuel at relatively low temperatures. Catalytic combustion heretofore has been generally regarded as having limited practicality in providing a source of power as a consequence of the need to employ impractically large amounts of catalyst so as to make a system unduly large and cumbersome. Consequently, catalytic combustion has been limited generally to such operations as treating tail gas streams of nitric acid plants, where the catalytic reaction is employed to heat spent process air containing about 2% oxygen at temperatures in the range of about 1400°F. Catalytic oxidation reactions follow the course of the graph of FIG. 1 of the accompanying drawings, to the extent of Regions A, B and C of that graph. FIG. 1 represents a plot of temperature against rate of reaction.

For any given catalyst and set of reaction conditions, as the temperature in catalytic combustion is initially increased, the reaction rate is also increased as shown in the kinetic region A of the rate curve of FIG. 1. This rate of increase is exponential with temperature. As the temperature is raised further, the reaction rate then passes through a transistion zone where the limiting parameters determining reaction rate shift from catalytic to mass transfer (region B of the curve in FIG. 1). When the catalytic rate increases to such an extent that the reactants cannot be transferred to the catalytic surface fast enough to keep up with the catalytic reaction rate, the reaction shifts to mass transfer control, and the catalytic reaction rate levels off regardless of further temperature increases. The reaction is then said to be mass transfer limited (region C of the curve of FIG. 1). In mass transfer controlled catalytic reactions, one cannot distinguish between a more active catalyst and a less active catalyst because the intrinsic catalyst activity is not determinative of the rate of reaction. Regardless of any increase in catalytic activity above that required for mass transfer control, a greater catalytic conversion rate cannot be achieved for the same set of conditions.

Because of this limitation, in order to increase the conversion rate for any given system, it appears essential either to increase the amount of catalyst surface or to increase the rate of mass transfer of reactants to the surface. The former, for practical combustion systems, would require either a catalyst size of such magnitude as to be unwieldy or a catalyst configuration which results in increased specific pressure drop and which would require unwieldy geometry to hold a total pressure drop constant. For example, in the case of gas turbine engines, the catalytic reactor might very well be larger than the engine itself. On the other hand, increasing the rate of mass transfer of reactants to the catalytic surfaces would result in increased pressure drop and consequently a substantial loss of energy; sufficient pressure drop may not even be available to provide the desired rate of reaction. Quite obviously, these approaches, while theoretically possible, are quite impractical.

The method and system of my said copending application stems from my discovery that it is possible to achieve essentially adiabatic combustion in the presence of a catalyst at a reaction rate many times greater than the mass transfer limited rate. That is, I have found that catalytically-supported, thermal combustion surmounts the mass transfer limitation. If the operating temperature of the catalyst is increased substantially into the mass transfer limited region, the reaction rate again begins to increase exponentially with temperature (region D of the curve of FIG. 1). This is an apparent contradiction of catalytic technology and the laws of mass transfer kinetics. The phenomena may be explained by the fact that the catalyst surface and the gas layer near the catalyst surface are above a temperature at which thermal combustion occurs at a rate higher than the catalytic rate, and the temperature of the catalyst surface is above the instantaneous autoignition temperature of the fuel-air admixture (defined hereinbelow). The fuel molecules entering this layer spontaneously burn without transport to the catalyst surface. As combustion progresses, it is believed that the layer becomes deeper. The total gas is ultimately raised to a temperature at which thermal reactions occur in the entire gas stream rather than only near the surface of the catalyst. Once this stage is reached within the catalyst, the thermal reactions continue even without further contact of the gas with the catalyst as the gas passes through the combustion zone.

The term "instantaneous auto-ignition temperature" for a fuel-air admixture as used herein is defined to mean that the temperature at which the ignition lag of the fuel-air mixture entering the catalyst is negligible relative to the residence time in the combustion zone of the mixture undergoing combustion.

In accordance with the invention of my said copending application, catalytically-supported thermal combustion is achieved by contacting at least a portion of the carbonaceous fuel intimately admixed with air with a solid oxidation catalyst having an operating temperature substantially above the instantaneous auto-ignition temperature of the fuel-air admixture. At least a portion of the fuel is combusted under essentially adiabatic conditions. Combustion is characterized by the use of a fuel-air admixture having an adiabatic flame temperature substantially above the instantaneous auto-ignition temperature of the admixture but below a temperature that would result in any substantial formation of oxides of nitrogen. The adiabatic flame temperature is determined at catalyst inlet conditions. The resulting effluent is characterized by high thermal energy useful for generating power and by low amounts of atmospheric pollutants. Where desired, combustible fuel components, e.g., uncombusted fuel or intermediate combustion products contained in the effluent from the catalytic zone, or fuel-air admixture which has not passed through a catalytic zone, may be combusted in a thermal zone following the catalytic zone, as explained hereinbelow in greater detail.

Sustained catalytically-supported, thermal combustion of this invention occurs at a substantially lower temperature than in conventional adiabatic thermal combustion and therefore it is possible to operate without formation of significant amounts of $NO_x$. Combustion is no longer limited by mass transfer as in the case of conventional catalytic combustion, and at the specified operating temperatures the reaction rate is substantially increased beyond the mass tranfer limitation, e.g., at least about 5 or 10 times greater than the mass transfer limited rate. Reaction rates of up to about 100 or more times the mass transfer limited rate may be attainable. Such high reaction rates permit high fuel space velocities which normally are not obtainable in catalytic reactions. I can employ, for instance, at least an amount of fuel equivalent in heating value to about 300 pounds of propane per hour per cubic foot of catalyst, and this amount may be at least several times greater, for instance, an amount of fuel equivalent in heating value to at least about 1000 pounds of propane per hour per cubic foot of catalyst. There is, moreover, no necessity of maintaining fuel-to-air ratios in the flammable range, and consequently loss of combustion (flame-out) due to variations in the fuel-to-air ratio is not the problem it is in conventional combustors.

The adiabatic flame temperature of fuel-air admixtures at any set of conditions (e.g., initial temperature and, to a lesser extent, pressure) is established by the ratio of fuel to air. The admixtures utilized are generally within the inflammable range or are fuel-lean outside of the imflammable range, but there may be instances of a fuel-air admixture having no clearly defined inflammable range but nevertheless having a theoretical adiabatic flame temperature within the operating conditions of the invention. The proportions of the fuel and air charged to the combustion zone are typically such that there is a stoichiometric excess of oxygen based on complete conversion of the fuel to carbon dioxide and water. Preferably, the free oxygen content is at least about 1.5 times the stoichiometric amount needed for complete combustion of the fuel. Although the invention is described herein with particularity to air as the non-fuel component, it is well understood that oxygen is the required element to support proper combustion. Where desired, the oxygen content of non-fuel component can be varied and the term "air" is used herein to refer to the non-fuel components of the admixtures. The fuel-air admixture fed to the combustion zone may have as low as 10 percent free oxygen by volume or less, which may occur, for example, upon utilization as a source of oxygen of a waste stream wherein the portion of this oxygen has been reacted. In turbine operations, the weight ratio of air to fuel charged to the combustion system is often above about 30:1 and some turbines are designed for air-to-fuel ratios of up about 100 or 200 or more:1.

The carbonaceous fuel, which when burned with a stoichiometric amount of air (atmospheric composition) at the combustor inlet temperature usually has an adiabatic flame temperature of at least about 3300°F., is combusted essentially adiabatically in the catalyst zone. Although the instantaneous auto-ignition temperature of a typical fuel may be below about 2000°F., stable adiabatic combustion of the fuel below about 3300°F. is extremely difficult to achieve in practical primary combustion systems. It is for this reason that even with gas turbines limited to operating temperatures of 2000°F., the primary combustion is typically at temperatures in excess of 4000°F. As stated above, in the invention of my said copending application, combustion is characterized by using a fuel-air admixture having an adiabatic flame temperature substantially above the instantaneous auto-ignition temperature of the admixture but below a temperature that would result in any substantial formation of $NO_x$. The selection of the adiabatic flame temperature limits is governed largely by residence time and pressure. Generally, adiabatic flame temperatures of the admixtures are in the range of about 1700° to 3200°F., and preferably are about 2000° to 3000°F. Operating at a temperature much in excess of 3200°F. results in significant formation of $NO_x$ even at short contact times; this derogates from the advantages of the invention vis-a-vis a conventional thermal system. A higher temperature within the defined range is desirable, however, because the system will require less catalyst and thermal reactions are an order of magnitude or more faster, but the adiabatic flame temperature employed can depend on such factors as the desired composition of the effluent and the overall design of the system.

It will thus be observed that a fuel which would ordinarily burn at such a high temperature as to form $NO_x$, is successfully combusted within the defined temperature range without significant formation of $NO_x$. Although combustion occurs adiabatically, it should be understood that for practical operations there may be heat losses to the environment from the combustion zone. A loss in temperature as measured by the effluent temperature may be as much as about 300°F. and preferably is not more than about 150°F. Notwithstanding these minor heat losses, the operation from a practical standpoint is considered adiabatic, and the heat of reaction is released primarily in the effluent gases. Thus there may be about four times, preferably at least about seven times, more heat released (thermal energy) in these gases than is lost from the combustion zone.

The catalyst in the catalytically supported thermal combustion generally operates at a temperature approximating the theoretical adiabatic flame temperature of the fuelair admixture charged to the combustion zone. The entire catalyst may not be at these temperatures, but preferably a major portion, or essentially all, of the catalyst surface is at such operating temperatures. These temperatures are usually in the range of about 1700° to 3200°F., preferably about 2000°F. to about 3000°F. The temperature of the catalyst zone is controlled by controlling the composition and initial temperature of the fuel-air admixture, i.e., adiabatic flame temperature, as well as the uniformity of the mixture. Relatively higher energy fuels can be admixed with larger amounts of air in order to maintain the desired temperature in a combustion zone. At the higher end of the temperature range, shorter residence times of the gas in the combustion zone appear to be desirable in order to lessen the chance of forming $NO_x$. The residence time is governed largely by temperature, pressure and space throughput, and generally is measured in milliseconds. The residence time of the gases in the catalytic combustion zone and any subsequent thermal combustion zone may be below about 0.1 second, preferably below about 0.05 second. The gas space velocity may often be, for example, in the range of about 0.5 to 10 or more million cubic feet of total gas (standard temperature and pressure) per cubic foot of total combustion zone per hour. For a stationary turbine burning diesel fuel, typical residence times could be about 30 milliseconds or less; whereas in an automotive turbine engine burning gasoline, the typical residence time may be about 5 milliseconds or less. The total residence time in the combustion system should be sufficient to provide essentially complete combustion of the fuel, but not so long as to result in the formation of $NO_x$.

Nitrogen oxides found in the effluent may have been introduced to the system from the air supply or even from the fuel as an impurity. Combustion occurs, however, without the substantial formation of $NO_x$, in my catalytically supported thermal combustion system. Typically, the combustion effluent will contain less than about 15, or less than about 10, parts per million by volume of $NO_x$ above the amount fed to the combustion system. Values lower than those present in the incoming air have been measured. In addition, the effluent from combustion of a nitrogen free carbonaceous fuel may typically contain less than about 2 parts per million by volume of $NO_x$. It is of further significance that the effluent typically may contain less than about 10 parts per million by volume hydrocarbons, and frequently even less than about 300 parts per million by volume carbon monoxide, and even less than about 20 parts per million. Effluents this low in pollutants are most acceptable and are far below any requirements of the Federal Emission Standards established by the Environmental Protection Agency for 1976 for automobile emissions.

The present invention, as in accordance with my earlier co-pending application Ser. No. 197,323, filed Nov. 10, 1971, provides a gas turbine system exhibiting markedly increased efficiency and greater power and employing catalytically supported thermal combustion in accordance with my earlier application Ser. No. 358,411. According to the present invention, combustion occurs under essentially adiabatic conditions to form an effluent containing uncombusted fuel values, and at least part of the uncombusted fuel values are thermally combusted in an expansion zone positioned in the path of the effluent to counteract the cooling effect occurring on expansion of the gases within the gas turbine. The turbine expansion zone is placed sufficiently close to the catalyst zone such that thermal combustion occurring subsequent to the catalyst will not go to completion except in the expansion zone. The turbine expansion zone, for example, may be the turbine wheel itself or nozzle means prior to the turbine wheel, or any combination thereof, and the like. In this manner, it is possible to maintain the temperature of the expanding gases at a higher level than otherwise obtainable. Thus, it is possible to obtain more power for a given size turbine, and to obtain higher efficiency in operation.

The present invention has as its purpose to provide an improved method for operating a catalytically supported thermal combustion turbine system without the formation of substantial amounts of nitrogen oxides. Other objects will be apparent to those skilled in the art from the present description, taken in conjunction with the appended drawings in which:

FIG. 1, as discussed above, is a plot of temperature versus rate of reaction for a catalytic oxidation reaction.

GENERAL STATEMENT OF THE INVENTION

Figure 1:
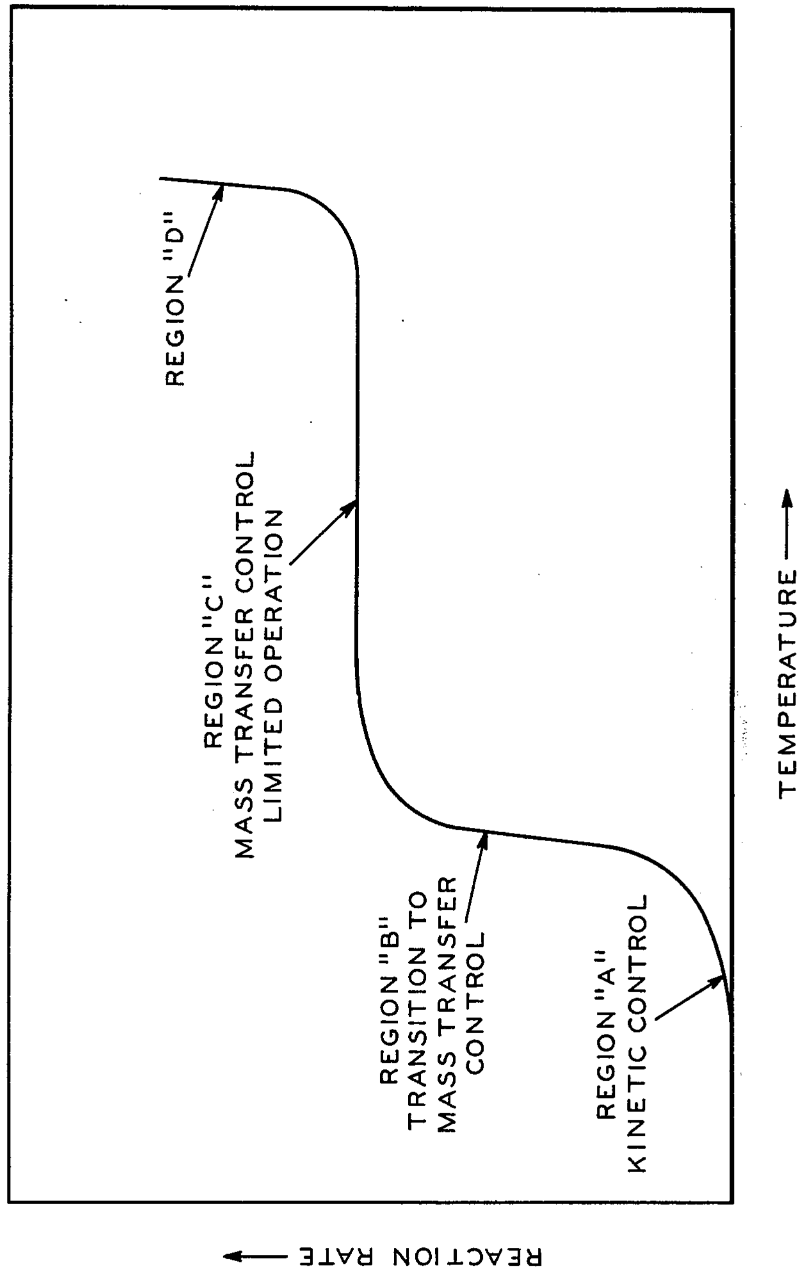

The present invention provides a method for highly efficient gas turbine operation wherein there can be relatively little pollution of the atmosphere by undesirable exhaust components, such as $NO_x$ and carbon monoxide, and wherein the combustion of the fuel is adapted for quick response to changes in the conditions of the system. The invention provides a highly efficient turbine operation in which thermal efficiency is improved by the continuous reheating effect obtained in a gas expansion zone of the turbine while enabling the maximum temperature in the turbine to remain in the range of about 1500° to 3200°F., preferably about 1700° to 2800°F., at which efficient operation occurs. Since in the method of this invention at least part of the thermal combustion of the partially combusted effluent from the combustion catalyst providing the catalytically supported thermal combustion occurs during gas expansion in the turbine, it is possible to combust more fuel for a given operating temperature due to the offset of the heat produced in the gas phase reaction in the turbine by the simultaneous loss of heat incurred through expansion of the combustion gases. This also provides greater power from the turbine at a given operating temperature.

In conventional systems, an increase in the amount of fuel in the fuel-air mixture results in an increase in temperature of the gas passing to the turbine, and hence, such prior art systems are limited to the use of a lesser amount of fuel if the maximum permissible gas temperature allowable in the turbine is not to be exceeded.

The system of my invention provides for combustion in a gas expansion zone of the turbine, and therefore the turbine delivers greater power because more fuel is combusted and average temperatures in the turbine are higher without any necessity for increasing turbine inlet temperatures. Consequently, the system of the present invention also has a faster response to changes in operating conditions than if the entire oxidation of the fuel took place prior to the expansion zone. The improved results provided by the present invention are very important since the efficient use of fuels and low contamination of the atmosphere are necessary and becoming more critical as time passes. The process of the invention may thus provide a gaseous effluent from the oxidation system having less than about 10 parts per million by volume (ppmv) hydrocarbons, less than about 300 ppmv carbon monoxide and less than about 15 ppmv nitrogen oxides, preferably less than about 4 ppmv nitrogen oxides.

The method of the present invention takes advantage of a sequence of fuel combustion zones, and improves the system by conducting at least a portion of the thermal combustion in a gas expansion zone of the turbine. This expansion may occur in the nozzles of a turbine or in the moving blades or buckets on a rotating turbine wheel or impeller. Part of the thermal combustion may occur in both of these types of expansion areas. As a result, a continuous reheating effect occurs within the turbine and this system provides for the highly efficient use of the fuel, greater than if no combustion occurs in the expansion zone, without the formation of undesirable amounts of nitrogen oxides during such combustion and the development of excessively high temperatures.

Part of the catalytically supported thermal combustion of the fuel-air mixture according to the method of this invention is conducted upstream of the turbine by combustion of the mixture while passing through an insufficient amount of catalyst to effect complete combustion of the fuel prior to passing through the turbine wheel or expansion zone. The partially combusted effluent from the catalyst, with or without substantial intermediate but incomplete further combustion, is introduced into a gas expansion zone of the turbine so that the partially combusted effluent is further thermally combusted while undergoing expansion. The further thermal combustion converts remaining combustible fuel components to carbon dioxide and water. The addition of heat to the system provided by combustion in the turbine gas expansion area counteracts the cooling in the system concomitant with the gas expansion. The turbine is thus operated under conditions which may be referred to as continuous reheating. The operating efficiency and work output of the turbine are thereby enhanced according to known reheating principles. Also, the reheating effect can be obtained without the necessity of employing plural turbine stages and separate reheating equipment. The present invention thus provides benefits even in turbines with a single impeller wheel or single stage; however, the invention can also be used where the combustion is accomplished in the gas expansion zones of a plurality of turbine wheels or stages. In the latter type systems, advantageous efficiencies can be obtained.

In one preferred embodiment of the invention, in which partial combustion is conducted upstream of the turbine by catalytically supported thermal combustion, a lesser amount of catalyst than is required for complete combustion of the fuel is used in the catalyst zone. Accordingly, and since at least a portion of the combustion is conducted in a downstream turbine gas expansion area, the system of this invention responds quickly to desired changes in operation, and yet the combustion can still produce an effluent from the work-performing zone having a relatively small amount of nitrogen oxides. As a consequence, the operation of this invention can be highly advantageous in turbines used for propelling automotive vehicles. A temperature lowering effect from expansion of the gases within the turbine expansion zone normally occurs in turbines, and this is counteracted in the present invention by providing at least some thermal combustion of fuel within the turbine gas expansion zone. Thus, for a turbine which operates at a given temperature, more fuel can be burned in the method of this invention as compared with conventional operations, without producing excessive temperatures in the turbine. The burning of larger amounts of fuels further increases the work output of the turbine and its thermal efficiency. Power from the turbine engine of this invention can be employed in various ways, for instance, the engine can serve especially as a prime mover for automotive, or other vehicles, or for the generation of electricity. Due to the conditions employed in the combustion operations of this invention, the combustion is very efficient, and, in addition, the exhaust gas from the turbine is not only low in carbon monoxide and hydrocarbon contents, but the amount of nitrogen oxides released into the atmosphere can be minimized. The present invention thus provides for efficient fuel combustion and power recovery with a minimum of atmospheric pollution.

Advantageously, excessively high temperatures are avoided upstream of the turbine wheel or expansion zone, and in such systems most, if not essentially all, of the combustion is accomplished at temperatures of about 1700° to 3200°F., preferably about 2000° to 3000°F. By this type of operation it is easier to insure that a significant portion of the combustion process will be accomplished in the turbine gas expansion zone, and excessive production of contaminating nitrogen oxides can more readily be avoided. Such temperature control can be exercised by thoroughly premixing the fuel with air before the fuel enters the catalytically-supported combustion zone and limiting the contact or residence time of the mixture in the initial combustion zone so that the combustion temperature is not excessive, i.e., does not exceed about 3200°F., and typically is not above about 3000°F. This combustion can be conducted non-catalytically and in the presence of flame, but it is preferred that it be accomplished by catalytically supported thermal combustion means of this invention. The feed to this catalytic oxidation zone is an intimate admixture of fuel, air, and, if desired, other selected materials, in vaporous form (e.g., gas, mist, aerosol, etc.) and these components are present in amounts such that the mixture has a theoretical adiabatic flame temperature at the conditions of the oxidation catalyst of at least about 1700°F., preferably at least about 2000°F., based on complete oxidation of the fuel to carbon dioxide and water.

Combustion upstream of the turbine expansion zone is preferably conducted under essentially adiabatic conditions. Thus, in spite of minor heat losses to the atmosphere, the conditions may be essentially adiabatic in this combustion zone since there may be little, if any purposeful cooling of the combustion zone by indirect heat exchange. Air or other inlet gases may be used to cool the combustion zone walls and to this extent could render the combustion less adiabatic in the combustion zone itself. The catalyst generally operates at a temperature approximating the theoretical adiabatic flame temperature of the fuel-air admixture charged to the combustion zone. The entire catalyst may not be at these temperatures, but preferably a major portion, or essentially all, of the catalyst surface is at such operating temperatures. These temperatures are usually in the range of about 1700° to 3200°F., preferably about 2000° to about 3000°F. To accomplish temperature control, the amounts of fuel, free nitrogen, free oxygen and any other components of the mixture fed to the combustion zone upstream of the turbine, and the conditions of reaction in this zone are controlled so that the zone is in the desired temperature range. Higher energy fuels can therefore be mixed with larger amounts of air, and perhaps other gases, than can lower energy fuels in order to maintain the desired temperature in the oxidation zone. The free oxygen content of the mixture fed to the oxidation zone upstream of the turbine is often at least about 1.1 or even at least about 1.5, preferably at least about 2, times the amount of that needed to completely oxidize the fuel to carbon dioxide and water.

In order to carry out the process of the invention, it is necessary to first mix fuel and air to prepare a mixture with the desired adiabatic flame temperature. Frequently, in mixing the fuel and air, mixtures are created which are within the flammability limits. Such flammable mixtures are easily ignited and may burn at temperatures in excess of 4000°F. This would produce unwanted $NO_x$. Combustion or detonation of the flammable mixture can be avoided by maintaining the velocity of the fuel-air mixture above its maximum flame propagation velocity, which can be achieved by means known in the art. Such velocity will prevent the development of combustion temperatures materially above 3200°F. as might occur upon flashback of combustion from the catalyst to the fuel rich region where the fuel is introduced. Preferably, the fuel-air mixture is above this maximum flame propagating velocity at the inlet to the initial combustion catalyst surface. It is to be understood that specific operations will generally define the maximum flame velocity which is controlled by various conditions of operations, such as amount of air and fuel present, the type of fuel employed, temperature and pressure, as is appreciated by those skilled in the art. Suitable gas velocities which are above the actual maximum linear velocity for flame propagation, are generally above about 3 feet per second.

In order to be compatible with practical turbine systems, it is desirable that the residence time of the combustion gases in the catalytic and thermal oxidation zones is blow about 0.1 second, preferably below about 0.05 second, and is thereby sufficient to give essentially complete combustion of the fuel without the production of objectional amounts of nitrogen oxides.

The overall gas space velocity may be, for example, in the range of about 1–10 or more million volumes of total gas (standard temperature and pressure) per volume of the total catalytic combustion zones per hour, although lower space velocities may also be used. The volume of catalyst is taken as the total superficial volume encompassing the active catalyst and any less active support, including any voids or gas passages through the catalyst.

Since only a portion of the fuel is combusted prior to the turbine expansion zones, the volume of catalyst prior to said expansion zones is a minor portion of the total amount that would be needed to completely oxidize all of the fuel to carbon dioxide and water at the conditions of the oxidation, and this amount of catalyst is at least sufficient to stabilize combustion. Thus the volume of catalyst in this oxidation zone may be less than about 0.5, preferably less than about 0.25, the amount that would be needed for complete combustion of the fuel. This amount may be as little as about 0.02 or 0.01 or less of the volume needed for complete combustion of the fuel.

Preferably, the combustion in the oxidation zones upstream of the turbine expansion area oxidizes up to about 60 weight percent of the fuel passing to this zone, and this amount may be up to about 75 weight percent, based on the theoretical conversion to carbon dioxide and water. The amount of oxidatation which occurs in the turbine gas expansion zone is often at least about 10 percent, preferably at least about 25 percent, of the total heating value of the fuel passing to the oxidation zone located upstream of the turbine, based on conversion to carbon dioxide and water. This amount may be about 60 percent or more of the heating value of the fuel. In order for combustion to take place within the turbine gas expansion zone in accordance with the invention, it is preferred that the combustion gases at the inlet to the turbine expansion zone be above the instantaneous auto ignition temperature of the fuel air mixture, but no higher than the maximum allowable turbine inlet temperature. The required residence time of the gases in the space between the catalyst and the inlet of the turbine expansion zone is a function of the temperature of the gases exiting the catalyst. In any event, the gas residence time between the exit of the upstream oxidation zone and the inlet of the turbine gas expansion zone may be minimal and is such that at least a significant amount of the combustion takes place in the turbine gas expansion zone. If desirable, this residence time may be so small that at least a major portion, and even essentially all, of the total combustion occurring subsequent to the upstream catalyst zone is in the turbine expansion zone.

The effluent from the overall oxidation system of this invention may not be completely free of unoxidized fuel, hydrocarbonaceous oxidation products and carbon monoxide, but the effluent will be low in these contaminants and nitrogen oxides. If necessary, or desirable, the gaseous effluent from the turbine can be further treated, e.g., by catalytic, catalytically-supported thermal combustion, or thermal combustion, to reduce the amount of combustible contaminants in the effluent. The catalytically-supported thermal combustion of the present invention has the further advantage in that quite large amounts of air or other gas can be passed through the combustion zone without fear of flameout through the use of excessive gas velocities or excessively lean fuel-air mixtures as long as the temperature of the catalyst located upstream of the turbine is sufficient to establish the oxidation of the fuel in the air-fuel mixture passing through the combustion zone. In turbine operations, the weight of air to fuel is often above about 20:1, and some turbines are designed for air-to-fuel ratios of up to about 100 or 200 or more:1. The gas expansion zone is generally such that the gas is expanded therein by a factor of at least about 2:1, i.e., the compression ratio is at least about 2:1.

In a typical operation according to this invention, fuel is combusted in contact with free or molecular oxygen and free or molecular nitrogen. The oxygen and nitrogen are most often supplied, for the most part, by air, although the mixture may be enriched by addition of more concentrated forms of oxygen or diluted with additional amounts of nitrogen or other essentially inert gases. The non-fuel components of the mixture are generally referred to herein as air. Frequently, the fuel-air mixture fed to the initial oxidation zone has at least about 10% free oxygen by volume, or even at least about 15%. The fuels employed in this invention contain carbon and thus are termed carbonaceous. These fuels are, at least when oxidized in accordance with this invention, essentially in the vapor state and have sufficiently high energy that, when oxidized with a stoichiometric amount of air will exhibit an adiabatic flame temperature of at least about 3300°F. The fuels may be gaseous or liquid at ambient conditions and are exemplified by, for instance, methane, ethane, propane, and other low molecular weight hydrocarbons; naphtha, kerosene and other normally liquid hydrocarbons; as well as other carbonaceous fuels such as carbon monoxide, alkanols of 1 to 4 carbon atoms, especially methanol, and other materials containing combined oxygen. The fuel may occur or be obtained in admixture with components which are essentially inert in the oxidation system. The fuel has a relatively high energy content and is of a nature which permits the preparation of the oxidation feed streams used in the present invention.

The solid catalyst which can be used in accordance with the present invention can have various forms and compositions and can be the types used or generally known in the art to oxidize fuels in the presence of molecular oxygen. The catalyst can be in the form of relatively small, solid particles of various sizes and shapes, often in sizes below about one inch in the largest dimension, with a plurality of such particles being arranged together to form one or more catalyst masses or beds in the combustion zone. The catalyst is preferably of larger form and has a skeletal structure with gas flow paths therethrough. The unitary or honeycomb-type catalyst are examples of this preferred form, see, for instance, U.S. Pat. No. 3,565,830. The catalyst generally have one or more metal containing components which are catalytically active towards promoting the desired oxidation reactions, and in view of the rather high temperatures at which the catalyst used in this invention operate, materials normally considered to be relatively inactive or insufficiently active, to promote adequately the oxidation of the fuel, may be suitable. The catalytic metal may be in a combined form, such as an oxide, rather than being solely in the elemental state, and preferably the catalytic metal compound is carried by a less catalytically-active, or even an essentially inert, support which may be, for instance, ceramic in nature. In these catalysts, the more catalytically-active metal component is often a minor amount of the catalyst, while the support is the major portion. The catalytically-active metals are often in the following groups of the periodic chart of the elements, and thus in Groups IB, IIB, or III to VIII or in the rare earth or lanthanide series. The catalytically-active forms of these metals are used and the oxides of a given metal, e.g., aluminum, may be more active or less active depending on its physical state, degree of hydration and other factors as is known in the art. Generally speaking, however, the catalytic components of the metals of Groups III and IV, for instance, silica, alumina, zirconia and their mixtures, are less active than the catalytic forms of the Group VIII metals, particularly the platinum group metals, such as platinum, palladium and rhodium; or the metals of Groups IB, IIB, V, VI, VII, the iron series of Group VIII and the rare earth metals, e.g., Cu, Cr, Ni, Co, V, Fe, Ce and the like. In some preferred forms, the catalyst used may be composed of both a more active component having one or more metals from Groups IB, IIB and V to VIII or from the rare earths, along with one or more less catalytically-active components of metals from Groups III and IV, and these combinations may or may not be, but preferably are, supported on a still less active, and even essentially inert, carrier. For example, such a catalyst may contain 1% platinum in active form and 10% alumina in active form carried on a honeycomb alpha-alumina or cordierite support, or the platinum may be replaced by minor amounts of chromium and cerium oxides. The catalyst is preferably arranged in the combustion zone so that the pressure drop of the gases passing through the catalyst is below about 10 psi, or even below about 3 psi.

The unitary, skeletal structure support type of oxidation catalyst can be characterized by having a plurality of flow channels or paths extending therethrough in the general direction of gas flow. The flow channels need not pass straight through the catalyst structure and may contain flow diverters or spoilers. The skeletal structure support is preferably constructed of a substantially chemically inert, rigid, solid material capable of maintaining its shape and strength at high temperatures, for instance up to about 3200°F. or more. The support may have a low thermal coefficient of expansion, good thermal shock resistance, and low thermal conductivity. Often, the skeltal support is porous but its surface may be relatively non-porous, and it may be desirable to roughen its surface so that it holds the catalyst coating better, especially if the support is relatively non-porous. The support may be metallic or ceramic in nature or a combination thereof.

The channels through the unitary body or skeletal structure can be of any shape and size consistent with the desired superficial surface and should be large enough to permit relatively free passage of the gas mixture. The channels may be parallel, or generally parallel, and extend through the support from one side to an opposite side, such channels being separated from one another by preferably thin walls. The channels may also be multi-directional and may even communicate with one or more adjacent channels. The channel inlet openings can be distributed across essentially the entire face or cross-section of the support subject to initial contact with the gas to be oxidized.

Specific Description of the Invention

A preferred form of the present invention will be described further in connection with the simplified drawing of FIG. 2, which is a diagrammatic, partly sectional representation of a turbine system embodying the present invention, and by the schematic representations of FIGS. 3, 4 and 5.

Figure 2:
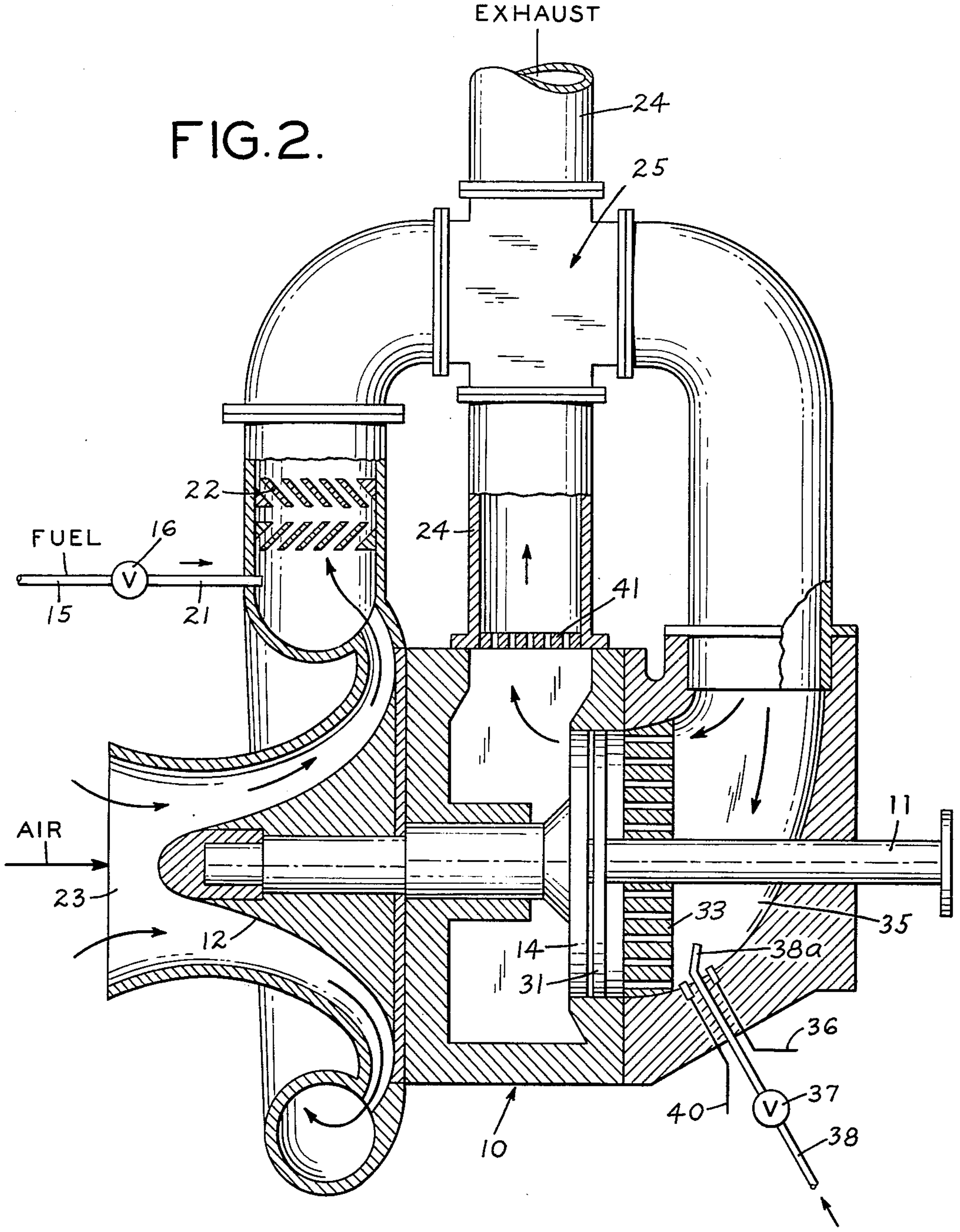
FIG. 2 is a diagrammatic, partially sectional representation of a turbine system, embodying the present invention, and in which the method may be practiced.

With reference to FIG. 2 of the drawing, turbine (10) has a rotatable power shaft (11) carrying a turbinetype air compressor (12) and gas power turbine wheel (14). Often the turbine will have a plurality of such wheels or stages. The shaft (11) can be connected to any suitable power transmission system to use the power imparted to the shaft by turbine wheel (14). Turbine (10) may, for example, have a high or relatively low compression ratio. The structure, operation, and control of such turbines are known in the art, and details in this regard are omitted from this description since they are unnecessary to explain the present invention.

A hydrocarbon fuel, for instance, propane or straight run petroleum naphtha, enters the turbine system by way of line (15), using valve (16), to regulate the amount of fuel sent to the turbine system. The fuel passes from valve (16) through line (21) and is introduced into air entering the compressor by way of inlet (23). The resulting mixture of fuel and air varies from fuel-rich in the immediate vicinity of where the fuel is introduced to fuel-lean in the bulk mixed fuel-air phase, and thus flammable gases must exist in the mixture. Gas velocities, desirably above the flame propagating velocity, are used to insure against detonations.

The gaseous mixture of air and fuel passes through mixing vanes (22) and heat exchanger (25) to stationary combustor catalyst (33). The exit of combustor catalyst (33) communicates with conventional gas expansion turbine nozzles (31) and turbine wheel (14), and discharges the gaseous effluent from the catalyst directly into the gas expansion nozzles (31). The details of the structure of such nozzles is not shown since such is well known. The turbine wheel (14) is placed sufficiently close to the combustor catalyst (33) so that at the rate of gas flow, the combustion gases will have been only partially thermally combusted when they reach the gaseous expansion zone represented by expansion nozzles (31) and turbine wheel (14). Expressed another way, insufficient catalyst is employed to more than partially thermally combust the fuel before reaching expansion nozzles (31). The fuel-air mixture flows through the combustor catalyst (33) without significant pressure drop.

Positioned upstream of combustor catalyst (33) are ignitor (36), and fuel inlet line (38) leading into the gas passage (35) adjacent ignitor (36). Injection of this fuel by line (38) is controlled by valve (37). As shown, fuel inlet line (38) is turned away from the catalyst (33) at (38*a*) to be sure that the flame therefrom will not impinge on the catalyst. Thermocouple (40) is positioned at the inlet of combustor catalyst (33) so that the thermocouple detects the temperature of the combustor at this location. The gaseous effluent from combustor catalyst (33) is further combusted upon passage into the nozzles (31) of power turbine wheel (14) where the gases serve as a motive fluid to impart rotating power to shaft (11). The gases emitting from the turbine wheel (14) are passed to catalyst (41) which completes the combustion by the catalytically supported thermal combustion of the invention. The gases then exit from the turbine by exhaust line (24) after being passed in indirect heat exchange with the air-fuel mixture in heat exchanger (25).

In the operation of the system of FIG. 2 of the drawings, after air flow is established ignitor (36) is activated and fuel introduced into passage (35) by injection from line (38) during start-up of the engine and is thermally combusted with a flame until the temperature of the combustor catalyst (33) is high enough so that the catalyst will initiate combustion of the fuel when ignitor (36) is shut down. During this time, valve (16) is closed. When operation of the catalyst has been established, ignitor (36) can be incapacitated and fuel by line (38) shut off by closing valve (37). The valve (16) is opened and line (21) becomes the source of fuel to the system.

During start-up of the turbine and the bringing of combustor catalyst (33) to operating temperature, the mixture of fuel and air is in the inflammable range at the conditions existing adjacent the ignitor (36), and the velocity of the gases in contact with the ignitor is such that flame propagation velocity is not exceeded. Accordingly, in this period, there will be flame in the vicinity of ignitor (36) and the heat produced thereby serves to increase the temperature of the combustor catalyst (33) sufficiently so that it will be effective to cause oxidation of the fuel when ignitor (36) is not in operation. To transfer from conventional flame combustion to catalytically supported thermal combustion using the catalyst, the discharge of supplemental fuel into the combustion zone via line (38) is, as described above, discontinued, extinguishing the flame. Valve (16) is opened and fuel entering the air stream via line (21) then serves to establish catalytically supported thermal combustion according to this invention and the velocity of the gases entering combustor catalyst (33) is desirably above the maximum flame propagation velocity at the inlet of the catalyst.

In accordance with the method of this invention combustion of propane can be obtained by contact with combustor catalyst (33) employing my catalytically supported thermal combustion at temperatures in the range of about 1700°–3200°F. to initiate combustion and partially oxidize the fuel. For example, for a small regenerative turbine having a 4 to 1 compression ratio, a maximum turbine inlet temperature of 2100°F. and a maximum air flow rate of about 2 pounds per minute, the catalyst (33) may have an outside diameter of 1-½ inches and be 4-½ inches long in the form of a honeycomb structure having 100 channels per square inch of cross-sectional area and an open space of about 70% of the cross-section. With the fuel-air mixture at 1100°F. just before the catalyst inlet, at full air flow the catalyst converts about 60 to 70% of the fuel to combustion products and the effluent from the catalyst (33) has a temperature of about 2000°F. After contact with the combustion catalyst, the fuel is further oxidized by thermal combustion (supported by the preceding catalyst combustion zone 33) in the turbine expansion zone in which the nozzle and blade expansion areas have a gas flow path length of about 4 inches. These exhaust gases from the turbine are passed through another honeycomb catalyst, e.g., 3 inches outside diameter by 2 inches length and having 200 channels per inch and 68% open area, to oxidize remaining contaminants, if present, in the gases and thereby obtain an effluent gas containing minimal amounts of hydrocarbons, carbon monoxide and nitrogen oxides. This operation is similar in turbine performance to one in which the maximum operating temperature is about 2200°F. when the same amount of fuel is completely combusted before it reaches the turbine expansion zone.

Figure 3:
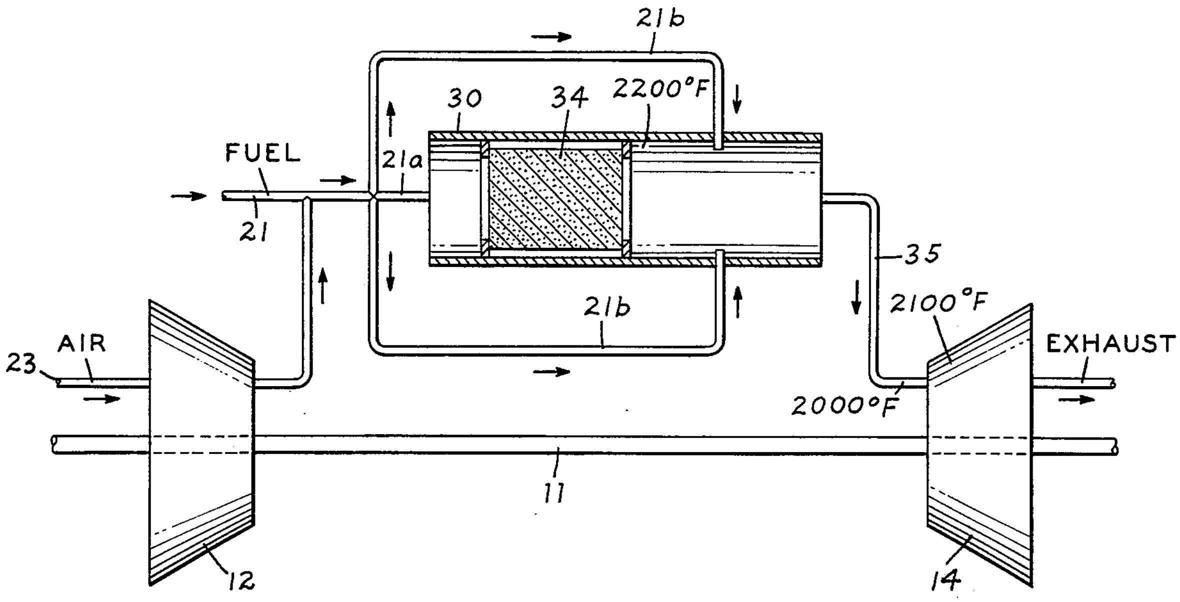
FIG. 3 is a schematic representation of an embodiment of the present invention employing a fuel air by-pass system to achieve greater efficiency.
Figure 4:
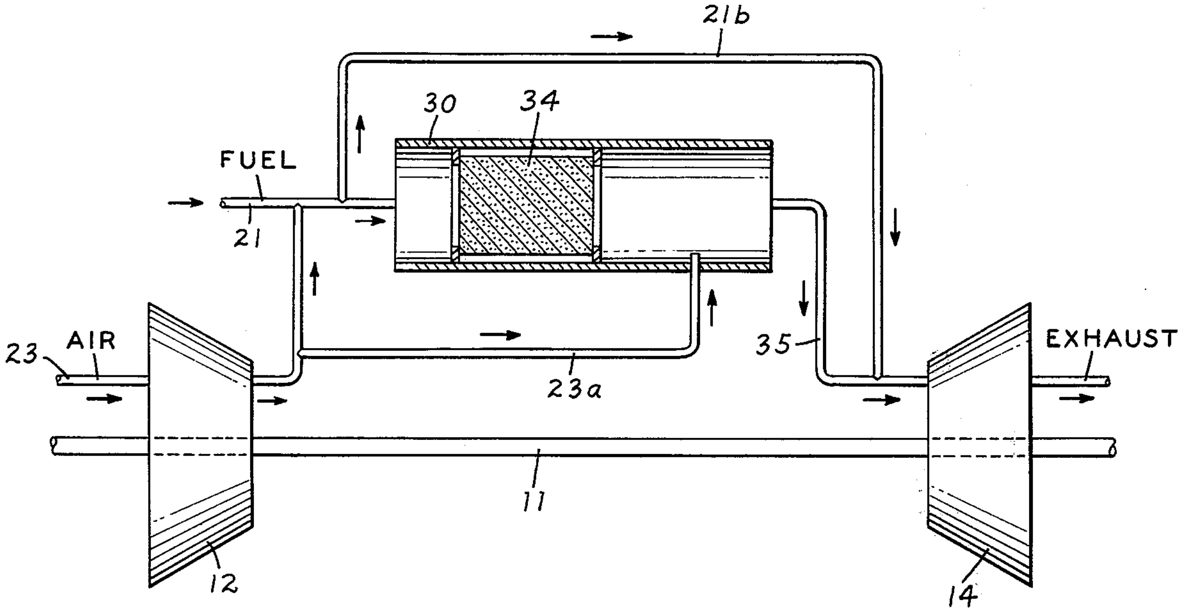
FIG. 4 is a schematic representation of another embodiment of the present invention, similar to that of FIG. 3, but employing also a separate additional air by-pass to the turbine.

FIGS. 3 and 4 are schematic representations of additional embodiments of the invention, providing modifications of the combustion system represented by FIG. 2. These embodiments, employing fuel-air by-pass, and optionally additional air by-pass, enable one to obtain even greater efficiencies in the operation of a combustion system and thus a turbine system. The advantages to be gained by employing fuel-air by-pass and/or additional air by-pass include for example lower combustor pressure drop, lower catalyst volume requirement and broader turn down ratio. The embodiments of FIGS. 3 and 4 employ a numbering system similar to each other and to that of FIG. 2.

The turbine represented in FIGS. 3 and 4 has a rotatable power shaft (11) carrying a turbine-type air compressor (12) and gas powered turbine (14). Air is introduced into the compressor (12) through inlet (23), where it is supplemented by fuel introduced through line (21). The fuel-air mixture resulting then passes through line (21*a*) to combustor (30) having catalyst (34). Part of the fuel-air mixture is introduced downstream of the catalyst bed (34) by two by-pass tubes (21*b*). This supplemental fuel-air mixture provides additional heat which is introduced into the gas turbine at (14) by virtue of gas passage (35). As in the embodiment of FIG. 2, at least 25% of the re-heat takes place in the wheel or nozzle of the turbine (14). Thus the additional fuel-air mixture introduced under pressure through by-pass tubes (21*b*) amplifies the expansion which takes place within the expansion zone of the gas turbine.

The diagram of FIG. 3 is provided with a representative temperature pattern.

The embodiment of FIG. 4 differs from that of FIG. 3 in having a separate additional supplemental air by-pass (23*a*) replacing one of the by-pass tubes (21*b*). Also the remaining by-pass tube (21*b*) enters gas passage (35), rather than the combustor (30). In accordance with the present invention the system of FIG. 4 can also be practiced without the supplemental fuel-air by-pass (21*b*) and the combustion supplemented by compressed air introduced via by-pass (23*a*).

Figure 5:
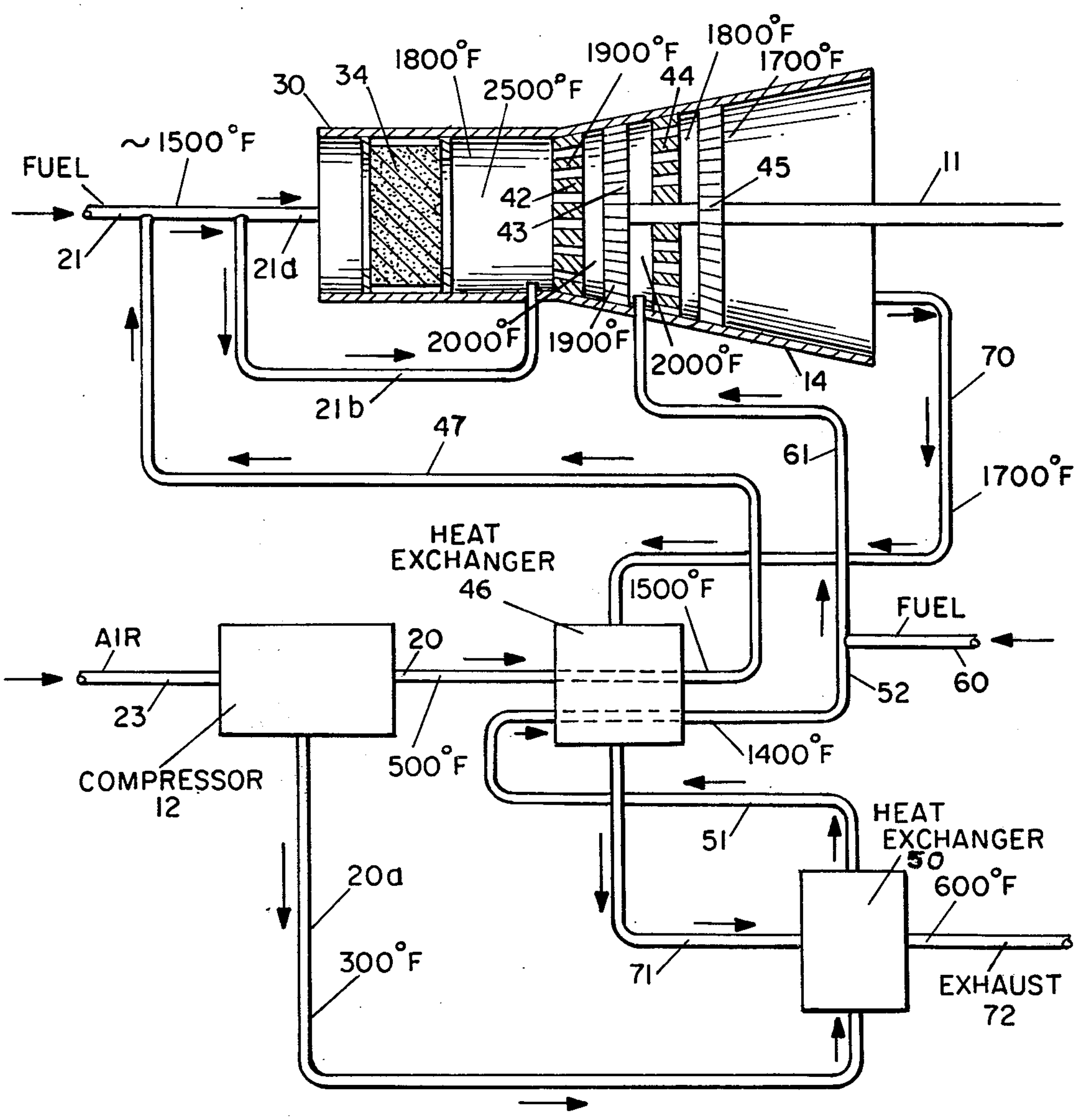
FIG. 5 is a schematic representation of a further preferred embodiment of the invention employing a by-pass and regenerative features to provide optimum efficiency in the system.

FIG. 5 is a schematic representation of another preferred embodiment of the invention, whereby a regenerative system is employed to provide extremely high efficiency and optimum recovery of heat values. FIG. 5 shows a representative temperature profile at various stages of the system. In the system, air is introduced through inlet (23) into compressor (12). The compressor provides a primary source of compressed air through tube (20) and a secondary, less highly compressed air supply through tube (20*a*). Highly compressed air through tube (20) passes through heat exchanger (46) where its temperature is increased. It then passes through tube (47) where it is mixed with fuel introduced through line (21). One such fuel is that introduced in an amount to provide a fuel-air mixture having an adiabatic flame temperature of about 2600°F. The fuel-air mixture resulting is passed through tube (21*a*) as a primary source of fuel-air mixture to the combustor (30) having a catalyst bed (34). A secondary supply of the fuel-air mixture is transported through by-pass tube (21*b*) into the combustor (30) downstream from the catalyst bed (34). Turbine (14) having shaft (11) has a first nozzle component (42), a first wheel component (43), a second nozzle component (44), and a second wheel component (45). The secondary supply of compressed air from tube (20*a*) passes through second heat exchanger (50), out through tube (51) into first heat exchanger (46) and out through tube (52) where it is mixed with second source of fuel (60) in proportions to provide a mixture of air and fuel which is preferably similar to that passing through combustor (30). The fuel-air mixture passes through line (61) where it is introduced downstream of first wheel (43). The emissions from the turbine are passed through pipe (70) to first heat exchanger (40) where much of its heat is imparted to compressed air from lines (21) and (51). The exhaust emitting from heat exchanger (46) is then passed through line (71) to second heat exchanger (50) where additional heat is imparted to compressed air from line (20*a*). The exhaust is then passed from the system into the atmosphere via line (72).

An excellent catalyst for use in the present invention can be made by slurrying 2400 grams of activated alumina powder, less than 40 mesh in size, in a mixer with a solution prepared by dissolving 2526 grams $Cr(NO_3)_3.9H_2O$ and 1382 grams $Ce(NO_3)_3.6H_2O$ in 890 ml. $H_2O$. The mixture is dried at 120°C. over a weekend. The dried solids are crushed and screened to less than 40 mesh, and then the powder is calcined for 4 hours at 1000°. 3200 grams of the powder is charged to a 3.4 gallon ball mill along with 3200 ml. $H_2O$ and 145.4 grams of palladium nitrate. The mill is rolled for 17 hours at 54 RPM. The resulting slip has a density of 1.63 grams per ml., a pH of 4.20 and a viscosity of 12 centipoises. 1625 grams of the asrecovered slip are diluted with 1180 ml. of a 1 percent nitric acid solution. An alpha alumina honeycomb is dipped in the diluted slip held for one minute, and then withdrawn from the slip and blown with air to remove excess slip.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

We claim:

1. A method for operating a gas turbine by catalytically supported thermal combustion of carbonaceous fuel comprising (a) forming an intimate admixture of fuel and air, (b) contacting in a combustion zone at least a portion of said fuel-air admixture with solid oxidation catalyst occupying a major portion of the flow cross section of said combustion zone, (c) thereby effecting sustained combustion of at least a portion of said fuel under essentially adiabatic conditions at a rate which surmounts the mass transfer limitation, said combustion being characterized by said fuel-air admixture having an adiabatic flame temperature such that upon contact with said catalyst the operating temperature of said catalyst is substantially above the instantaneous autoignition temperature of said fuel-air admixture but below a temperature that would result in any substantial formation of oxides of nitrogen, (d) forming an effluent of high thermal energy containing uncombusted fuel values, and (e) thermally combusting at least partially the uncombusted fuel values contained in said effluent in an expansion zone of the turbine positioned in the path of said effluent to counteract the cooling effect occurring on expansion of gases within said gas turbine, whereby said thermal energy of said effluent and the energy from thermally combusting said uncombusted fuel values are utilized in operation of the turbine.

2. A method according to claim 1 wherein said expansion zone of the gas turbine is a wheel positioned in the path of the effluent emitting from said oxidation catalyst before completion of said thermal combustion.

3. A method according to claim 1 wherein said expansion zone of the gas turbine is a nozzle means positioned in the path of the effluent emitting from said oxidation catalyst before completion of said thermal combustion.

4. A method according to claim 1 employing an amount of catalyst so that when the effluent emitting from said solid oxidation catalyst reaches the expansion zone of said gas turbine, only a portion of the thermal combustion has been completed.

5. A method according to claim 1 wherein the fuel employed, when burned with a stoichiometric amount of air, has an adiabatic flame temperature of at least about 3300°F.

6. A method according to claim 1 wherein operating temperature of said catalyst is maintained between about 1700° and 3200°F.

7. A method according to claim 1 wherein operating temperature of said catalyst is maintained between about 2000° and 3000°F.

8. A method according to claim 1 wherein said intimate admixture of fuel and air contains at least a stoichiometric amount of oxygen.

9. A method according to claim 1 wherein the velocity of said intimate admixture of fuel and air is in excess of the maximum flame propagating velocity of said intimate admixture.

10. A method according to claim 1 wherein at least about 25 percent of the thermal combustion takes place in the expansion zone of the gas turbine.

11. A method according to claim 1 wherein the resulting turbine effluent is catalytically combusted to reduce the content of combustibles.

12. A method according to claim 1 wherein a mixture of fuel and air is introduced downstream of the catalyst and prior to the expansion zone.

13. A method according to claim 1 wherein additional air is introduced subsequent to the catalyst and prior to the expansion zone.

14. A method according to claim 1 wherein additional fuel-air mixture is introduced in the expansion zone.

15. A method according to claim 14 wherein the additional fuel-air mixture is introduced between the nozzles and wheel of the gas turbine.

16. A method according to claim 1 wherein the exhaust from the turbine is heat exchanged to impart some of its heat values to the air intake.

* * * * *